United States Patent
Kozu (10) Patent No.: US 12,518,922 B2
(45) Date of Patent: Jan. 6, 2026

(54) DIELECTRIC POWDER, MULTILAYER CERAMIC ELECTRONIC DEVICE, MANUFACTURING METHOD OF DIELECTRIC POWDER AND MANUFACTURING METHOD OF MULTILAYER CERAMIC ELECTRONIC DEVICE

(71) Applicant: TAIYO YUDEN CO., LTD., Tokyo (JP)

(72) Inventor: Noriyuki Kozu, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 257 days.

(21) Appl. No.: 18/323,815

(22) Filed: May 25, 2023

(65) Prior Publication Data

US 2023/0395325 A1    Dec. 7, 2023

(30) Foreign Application Priority Data

Jun. 1, 2022    (JP) ................... 2022-089700

(51) Int. Cl.
| | |
|---|---|
| *H01G 4/12* | (2006.01) |
| *C04B 35/468* | (2006.01) |
| *H01G 4/012* | (2006.01) |
| *H01G 4/232* | (2006.01) |
| *H01G 4/30* | (2006.01) |

(52) U.S. Cl.
CPC ....... *H01G 4/1227* (2013.01); *C04B 35/4682* (2013.01); *H01G 4/012* (2013.01); *H01G 4/232* (2013.01); *H01G 4/30* (2013.01); *C04B 2235/3206* (2013.01); *C04B 2235/6583* (2013.01)

(58) Field of Classification Search
CPC ...... H01G 4/1227; H01G 4/012; H01G 4/232; H01G 4/30; H01G 4/12; C04B 35/4682; C04B 2235/3206; C04B 2235/6583; C04B 35/638; C04B 2235/3239; C04B 2235/3418; C04B 35/62675; C04B 35/62685; C04B 35/62807; C04B 2235/3224; C04B 2235/3236; C04B 2235/3262; C04B 2235/5445; C04B 2235/6584; C04B 2235/663; C01P 2002/52; C01G 23/003; C01G 23/006
See application file for complete search history.

(56) References Cited

U.S. PATENT DOCUMENTS

| | | | |
|---|---|---|---|
| 9,754,720 B2 * | 9/2017 | Yao ...................... | H01G 4/0085 |
| 12,080,482 B2 * | 9/2024 | Sugawara ............... | H01G 4/30 |
| 2003/0039090 A1 * | 2/2003 | Konaka ............... | H01G 4/1245 |
| | | | 361/311 |

(Continued)

FOREIGN PATENT DOCUMENTS

| | | | | |
|---|---|---|---|---|
| CN | 116947483 A | * | 10/2023 | ........... C04B 35/468 |
| JP | 2008239402 A | | 10/2008 | |

*Primary Examiner* — Dion R. Ferguson
(74) *Attorney, Agent, or Firm* — Law Office of Katsuhiro Arai (57) ABSTRACT

A dielectric powder includes barium titanate as a main component, at least one type of rare earth element that is solid-solved at 0.3 at % or more and 2.0 at % or less with respect to titanium, and magnesium that is solid-solved at 0.1 at % or more and 1.0 at % or less with respect to titanium.

20 Claims, 5 Drawing Sheets

(56) References Cited

U.S. PATENT DOCUMENTS

| | | | |
|---|---|---|---|
| 2011/0019334 A1* | 1/2011 | Nishigaki | H01G 4/1227 |
| | | | 361/301.4 |
| 2016/0042866 A1* | 2/2016 | Yao | H01G 4/0085 |
| | | | 361/301.4 |
| 2019/0279816 A1* | 9/2019 | Taniguchi | H01G 4/1245 |
| 2020/0402719 A1* | 12/2020 | Sugawara | H01G 4/248 |
| 2021/0210288 A1* | 7/2021 | Kang | C04B 35/49 |
| 2023/0395325 A1* | 12/2023 | Kozu | C01G 23/006 |
| 2024/0409470 A1* | 12/2024 | Misawa | C04B 35/4682 |

* cited by examiner

DIELECTRIC POWDER, MULTILAYER CERAMIC ELECTRONIC DEVICE, MANUFACTURING METHOD OF DIELECTRIC POWDER AND MANUFACTURING METHOD OF MULTILAYER CERAMIC ELECTRONIC DEVICE

CROSS-REFERENCE TO RELATED APPLICATION

This application is based upon and claims the benefit of priority of the prior Japanese Patent Application No. 2022-089700, filed on Jun. 1, 2022, the entire contents of which are incorporated herein by reference.

FIELD

A certain aspect of the present disclosure relates to a dielectric powder, a multilayer ceramic electronic device, a manufacturing method of a dielectric powder, and a manufacturing method of a multilayer ceramic electronic device.

BACKGROUND

In recent years, there has been an increasing demand for miniaturization and large capacity for multilayer ceramic capacitors. For this reason, the demand for miniaturization and large capacity has been met by thinning the dielectric layers forming the internal structure and increasing the number of stacked layers. However, by thinning the dielectric layer, the electric field intensity applied to the dielectric layer increases, which causes a problem of reduced reliability. In Japanese Patent Application Publication No. 2008-239402, since the dielectric part of the multilayer ceramic capacitor has core-shell structure particles in which a rare earth element and magnesium are solid-solved, the temperature characteristics of the dielectric constant are good. And the concentration of these elements becomes the highest at the outermost surface part of the particle. And, a high high-temperature load life can be obtained by setting the gradient of the concentration of rare earth elements and magnesium in the shell to 0.05 at %/nm or more.

SUMMARY OF THE INVENTION

However, if the gradient of the concentration of rare earth elements and magnesium in the shell increases, the concentration in the shell near the core decreases, or the raw material powder used has a particle size distribution, so some parts of the shell become thin due to variations in the thickness of the shell. And when a high electric field strength is applied, leakage current increases, and a sufficient high-temperature load life may not be necessarily obtained.

According to an aspect of the embodiments, there is provided a dielectric powder including: barium titanate as a main component; at least one type of rare earth element that is solid-solved at 0.3 at % or more and 2.0 at % or less with respect to titanium; and magnesium that is solid-solved at 0.1 at % or more and 1.0 at % or less with respect to titanium.

According to another aspect of the embodiments, there is provided a multilayer ceramic electronic device including: a plurality of dielectric layers that includes a core-shell grain including a core portion and a shell portion including an additive, the core portion has a structure, in which barium titanate is a main component, at least one type of rare earth element is solid-solved at 0.3 at % or more and 2.0 at % or less with respect to titanium, and magnesium is solid-solved at 0.1 at % or more and 1.0 at % or less with respect to titanium; a plurality of internal electrode layers, each of which faces each other through each of the plurality of dielectric layers; a first external electrode that is electrically connected to part of the plurality of internal electrode layers; and a second external electrode is electrically connected to another part of the plurality of internal electrode layers.

According to another aspect of the embodiments, there is provided a manufacturing method of a dielectric powder including: mixing at least one type of rare earth element, magnesium, barium compound and titanium compound so that an amount of the at least one type of rare earth element is 0.3 at % or more and 2.0 at % or less with respect to titanium and an amount of magnesium is 0.1 at % or more and 1.0 at % or less with respect to titanium; forming slurry of which a main component is barium titanate, by solid phase reaction of the at least one type of rare earth element, the magnesium, the barium compound and the titanium compound; and solid-solving the at least one type of tare earth element in the barium titanate by thermal treatment of the slurry.

According to another aspect of the embodiments, there is provided a manufacturing method of a multilayer ceramic electronic device including: forming a ceramic green sheet by adding an additive to a dielectric powder, in which barium titanate is a main component, at least one type of rare earth element is solid-solved at 0.3 at % or more and 2.0 at % or less with respect to titanium, and magnesium is solid-solved at 0.1 at % or more and 1.0 at % or less with respect to titanium; forming an internal electrode pattern on the ceramic green sheet; forming a multilayer structure by stacking a plurality of the ceramic green sheet on which the internal electrode pattern is formed; forming a multilayer chip by firing the multilayer structure so that the multilayer chip includes a plurality of dielectric layers that include a core-shell grain including a core portion and a shell portion including an additive, the core portion having a structure, in which barium titanate is a main component, at least one type of rare earth element is solid-solved at 0.3 at % or more and 2.0 at % or less with respect to titanium, magnesium is solid-solved at 0.1 at % or more and 1.0 at % or less with respect to titanium, and a plurality of internal electrode layers, each of which faces each other through each of the plurality of dielectric layers.

DETAILED DESCRIPTION

Hereinafter, an exemplary embodiment will be described with reference to the accompanying drawings.

Embodiment

Figure 1:
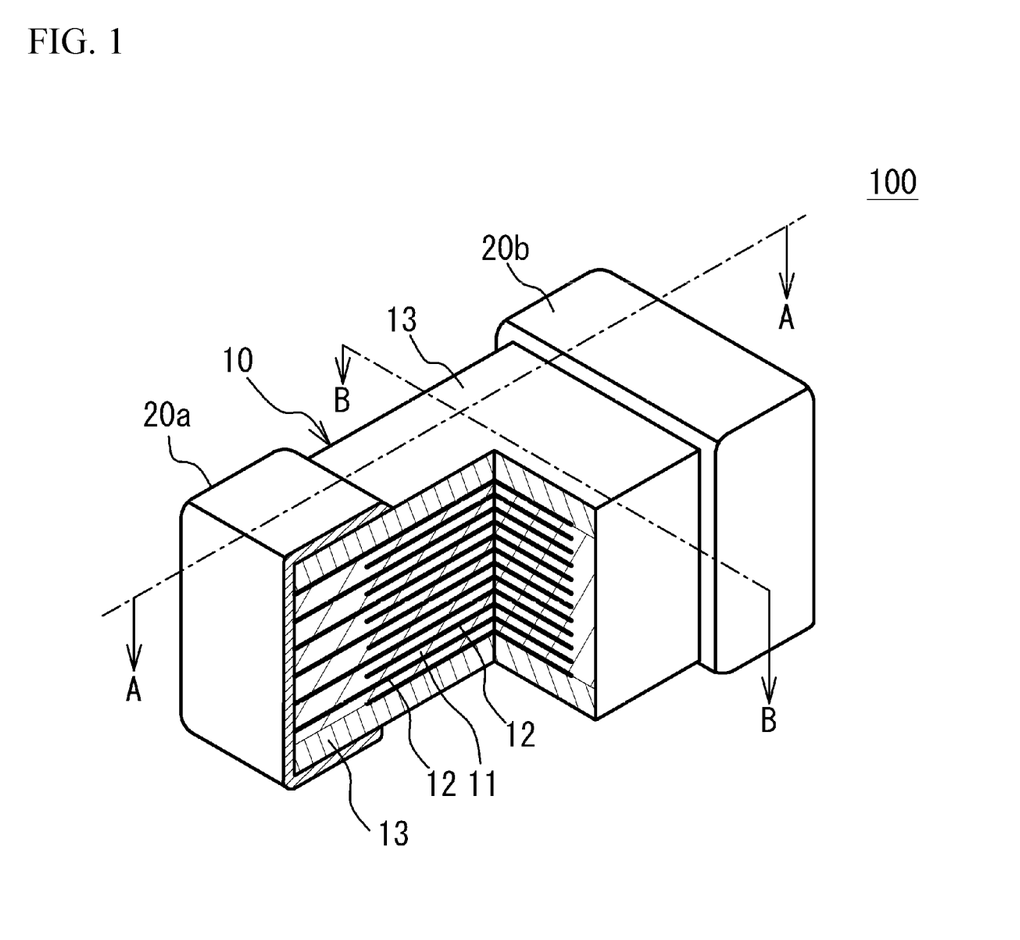
FIG. 1 is a partial cross-sectional perspective view of a multilayer ceramic capacitor.
Figure 2:
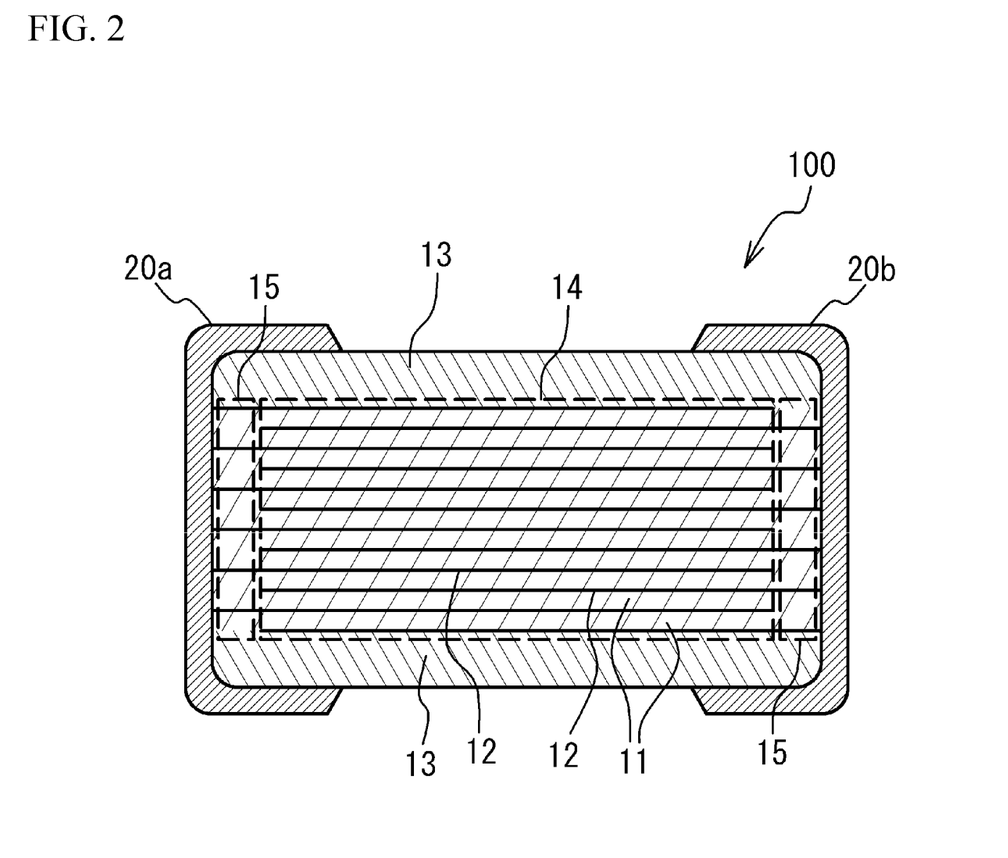
FIG. 2 is a cross-sectional view taken along line A-A in FIG. 1.
Figure 3:
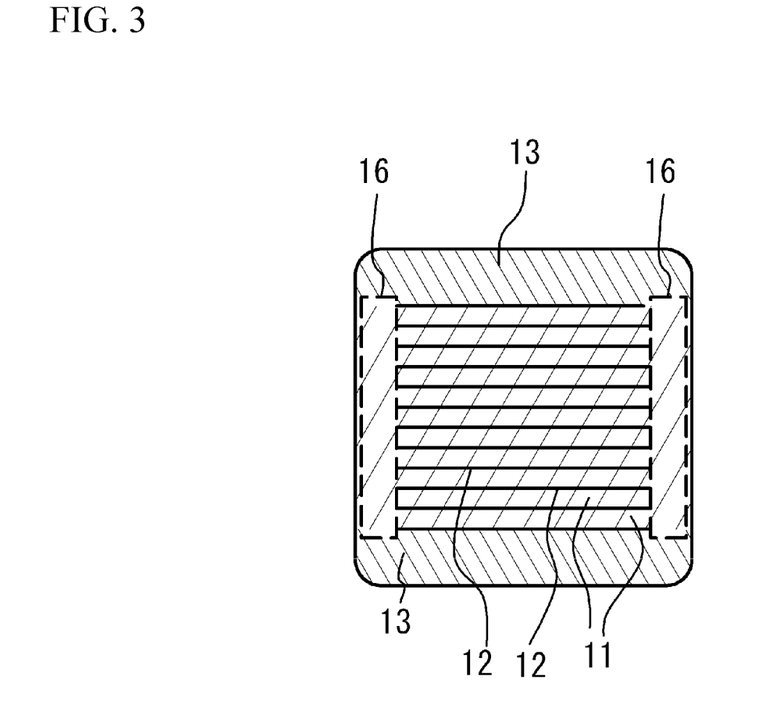
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two end faces of the multilayer chip 10 opposite to each other. Among four faces other than the two end faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure in which dielectric layers 11 containing a ceramic material acting as a dielectric and internal electrode layers 12 mainly composed of metal are alternately stacked. In other words, the multilayer chip 10 includes the internal electrode layers 12 facing each other and the dielectric layers 11 sandwiched between the internal electrode layers 12. The edges in the direction in which each internal electrode layer 12 extends are alternately exposed at a first end face provided with the external electrode 20a of the multilayer chip 10 and a second end face provided with the external electrode 20b. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 may be the same as the main component of the dielectric layer 11 or may be different from the main component of the dielectric layer 11. The structure of the multilayer ceramic capacitor 100 is not limited to FIG. 1 to FIG. 3, if the internal electrode layers 12 are extracted to two faces of the multilayer chip 10 and are conducted to two different external electrodes.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. In the embodiment, the ceramic material is $BaTiO_3$ (barium titanate). A part of the A site may be displaced with another element. And, a part of the B site may be displaced with another element. For example, in the dielectric layer 11, the concentration of barium titanate zirconate is 90 at % or more. For example, the thickness of the dielectric layer 11 is 0.2 μm or more and 10 μm or less, 0.2 μm or more and 5 μm or less, or 0.2 m or more and 2 μm or less.

Additives may be added to the dielectric layer 11. As additives to the dielectric layer 11, an oxide of magnesium (Mg), manganese (Mn), molybdenum (Mo), vanadium (V), chromium (Cr), or a rare earth element (yttrium (Y), samarium (Sm), europium (Eu), gadolinium (Gd), terbium (Tb), dysprosium (Dy), holmium (Ho), erbium (Er), thulium (Tm) and ytterbium (Yb), or an oxide of cobalt (Co), nickel (Ni), lithium (Li), boron (B), sodium (Na), potassium (K) or silicon (Si), or a glass including cobalt, nickel, lithium, boron, sodium, potassium or silicon.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them. For example, the thickness of the internal electrode layer 12 is 0.1 μm or more and 3 μm or less, 0.1 μm or more and 1 μm or less, or 0.1 μm or more and 0.5 μm or less.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin section 15. The section where the internal electrode layers 12 connected to the external electrode 20b face each other with no internal electrode layer 12 connected to the external electrode 20a interposed therebetween is another end margin section 15. That is, the end margin section 15 is a section where the internal electrode layers 12 connected to one of the external electrodes face each other with no internal electrode layer 12 connected to the other of the external electrodes interposed therebetween. The end margin section 15 is a section where no capacity is generated.

As illustrated in FIG. 3, in the multilayer chip 10, a section from one of the two side faces of the multilayer chip 10 to lateral side edges of the internal electrode layers 12 is referred to as a side margin section 16. That is, each of the side margin sections 16 is a section that covers the lateral side edges, extending toward one of the side faces of the multilayer structure, of the stacked internal electrode layers 12. The side margin section 16 is a section where no capacity is generated.

In the present embodiment, in the capacity section 14, at least part of the crystal grains included in the dielectric layer 11 have a core-shell structure having a core portion and a shell portion surrounding the core portion.

Figure 4A:
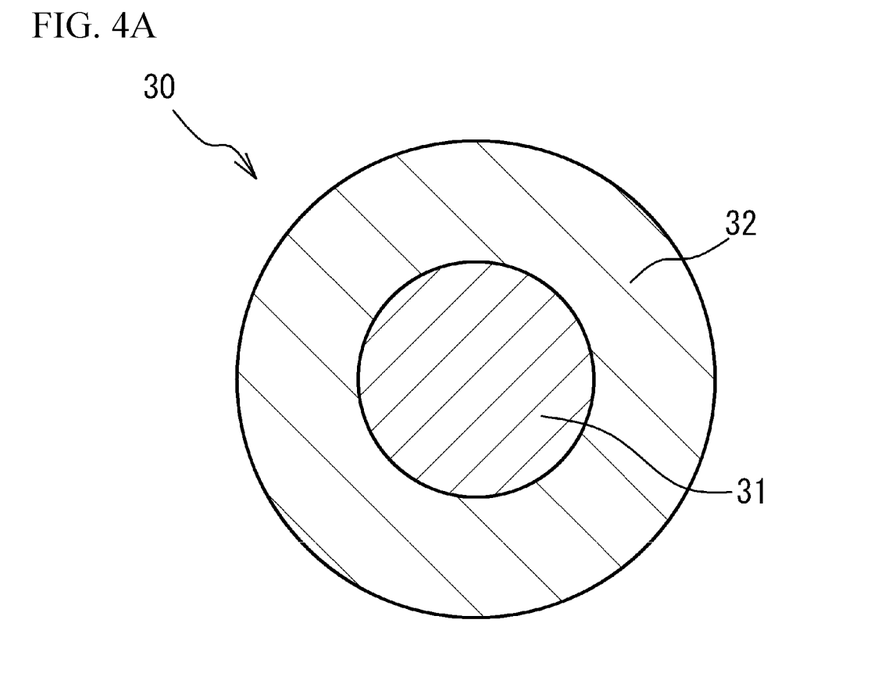
FIG. 4A illustrates a core-shell grain.

As illustrated in FIG. 4A, the core-shell grains 30 included in the dielectric layer 11 include a substantially spherical core portion 31 and a shell portion 32 surrounding and covering the core portion 31. The core portion 31 and the shell portion 32 are mainly composed of barium titanate. The core portion 31 is a crystal portion in which the solid solution amount of the additive compound is small. The shell portion 32 is a crystal portion in which the additive compound is solid-solved and has a concentration of the additive compound higher than that of the core portion 31.

Figure 4B:
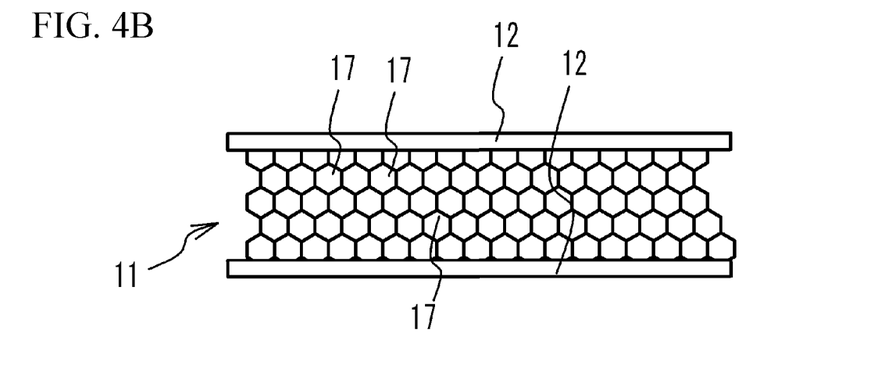
FIG. 4B illustrates a schematic cross section of a dielectric layer.

FIG. 4B is a schematic cross-sectional view of the dielectric layer 11. As illustrated in FIG. 4B, the dielectric layer 11 comprises a plurality of crystal grains 17 of the main component ceramic. At least some of these crystal grains 17 are the core-shell grains 30 described in FIG. 4A.

In the core portion 31, at least one kind of rare earth element is substituted and solid-solved at the A site, and magnesium is substituted and solid-solved at the B site. If the solid-solution amount of the rare earth element acting as a donor in the core portion 31 is small, the amount of oxide ion vacancies in the core portion 31 cannot be sufficiently suppressed, resulting in an increase in leakage current and a risk of shortening the high-temperature load life. Therefore, in the core portion 31, a lower limit is set for the total solid solution amount of the rare earth elements. In the present embodiment, in the core portion 31, the total solid solution amount of rare earth elements with respect to titanium is 0.3 at % or more, preferably 0.5 at % or more, and 0.7 at % or more. Note that at % with respect to titanium is the atomic concentration ratio when titanium is assumed to be 100 at %.

On the other hand, in the core portion 31, if the solid solution amount of the rare earth element is large, the temperature characteristic of the relative dielectric constant Fr may not necessarily satisfy the X7T characteristic. Therefore, in the core portion 31, an upper limit is set for the total solid solution amount of the rare earth elements. In the present embodiment, in the core portion 31, the total solid solution amount of rare earth elements is 2.0 at % or less, preferably 1.8 at % or less, and more preferably 1.5 at % or less with respect to titanium.

Next, if the solid-solution amount of magnesium acting as an acceptor in the core portion 31 is small, the electric neutrality of the core portion 31 cannot be maintained, which may lead to an increase in leakage current. Therefore, in the core portion 31, a lower limit is set for the solid solution amount of magnesium. In the present embodiment, the solid solution amount of magnesium in the core portion 31 is 0.1 at % or more, preferably 0.2 at % or more, and more preferably 0.3 at % or more with respect to titanium.

On the other hand, if the amount of solid solution of magnesium in the core portion 31 is large, the amount of oxide ion vacancies increases, the high-temperature load life is shortened, and the temperature characteristics of the dielectric constant may not necessarily satisfy the XT characteristics. Therefore, in the core portion 31, an upper limit is set for the total solid solution amount of magnesium. In the present embodiment, the solid solution amount of magnesium in the core portion 31 is 1.0 at % or less, preferably 0.9 at % or less, and more preferably 0.8 at % or less with respect to titanium.

As described above, the core portion 31 of the multilayer ceramic capacitor 100 according to the present embodiment contains barium titanate as a main component, and at least one rare earth element is solid-solved in the range of 0.3 at % to 2.0 at % with respect to titanium and 0.1 atomic % or more and 1.0 atomic % or less of magnesium is solid-solved. Therefore, the stability of the temperature characteristics of the dielectric constant is good, and the electrical neutrality can be maintained to reduce the leakage current. Even when a high electric field strength is applied due to the action of suppressing the formation of oxide ion vacancies, the leak current remains low and the increase in the leak current is suppressed, resulting in a long high-temperature load life.

It should be noted that the rare earth element solid-solved in the core portion 31 is preferably at least one of europium, gadolinium, dysprosium, or holmium. This is because they are likely to form a substitutional solid solution at the A site and act as a donor. The number of rare earth elements solid-solved in the core portion 31 may be one, or two or more. For example, both dysprosium and europium may be solid-solved in the core portion 31. When two or more rare earth elements are solid-solved in the core portion 31, the total solid solution amount of the rare earth elements means the solid solution amount of the two or more rare earth elements.

In the shell portion 32, the solid solution amounts of rare earth elements and magnesium are larger than those in the core portion 31. Specifically, the total at % of rare earth elements with respect to titanium is higher in the shell portion 32 than in the core portion 31. Also, the at % of magnesium to titanium is higher in the shell portion 32 than in the core portion 31. Other additives that are not solid-solved in the core portion 31 may be solid-solved in the shell portion 32.

Figure 5:
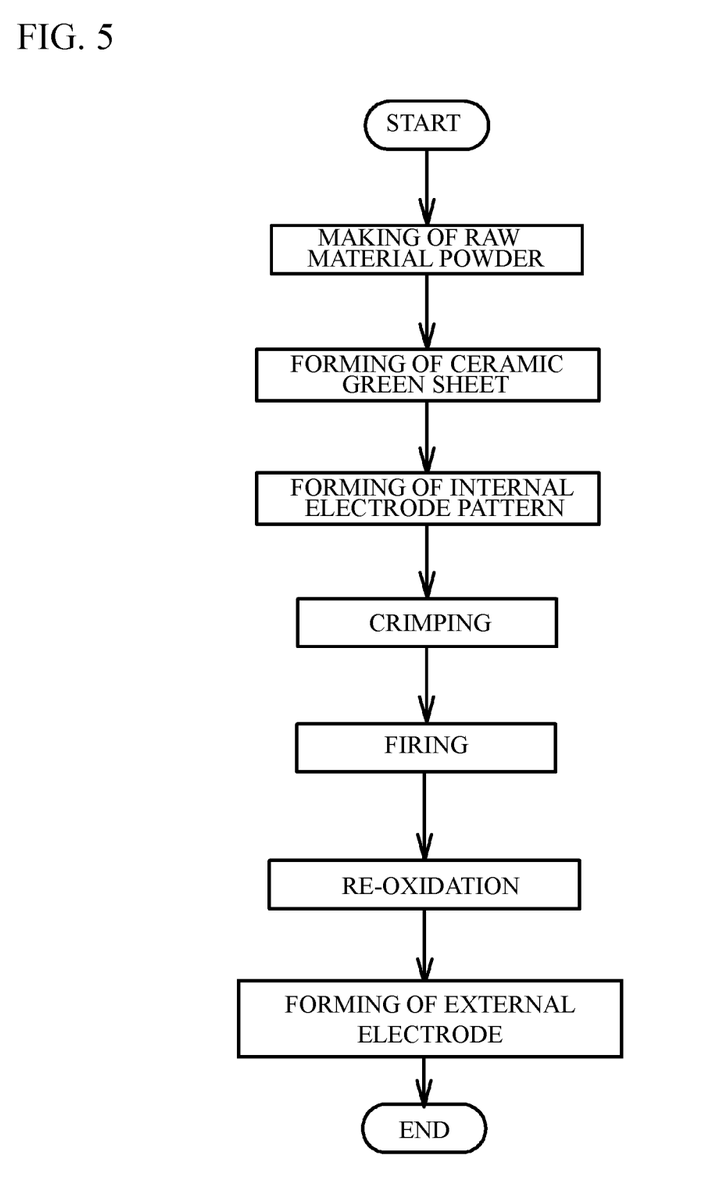
FIG. 5 is a flowchart of a manufacturing method of a multilayer ceramic capacitor.

Next, a description will be given of a manufacturing method of the multilayer ceramic capacitors 100. FIG. 5 illustrates a manufacturing method of the multilayer ceramic capacitor 100.

(Making process of raw material powder) First, a rare earth element compound, a magnesium compound, a barium compound, and a titanium compound are mixed and dispersed in an aqueous solution. As the rare earth element compound, for example, a rare earth element oxide is used. Magnesium oxide (MgO), for example, is used as the magnesium compound. Barium carbonate ($BaCO_3$), for example, is used as the barium compound. As the titanium compound, for example, titanium dioxide ($TiO_2$) is used.

For example, when a rare earth element is represented by "R", the rare earth element oxide $R_2O_3$ and magnesium oxide are dispersed in water, and an ammonium carboxylate is added as a dispersant to the aqueous solution. Barium carbonate and titanium dioxide are added to the resulting aqueous solution to form a slurry, and mixed and dispersed in the range of atomic concentration ratio of barium=0.975 or more and 1.000 or less.

The total amount of the rare earth elements added to barium titanate is 0.15 mol or more and 1.0 mol or less in terms of oxide ($R_2O_3$) with respect to 100 mol of barium titanate. That is, the total amount of rare earth elements added to 100 mol of titanium is set to 0.3 mol or more and 0.2 mol or less. The amount of magnesium added to barium titanate is 0.1 mol or more and 1.0 mol or less in terms of oxide (MgO). That is, the amount of magnesium added to 100 mol of titanium is set to 0.1 mol or more and 1.0 mol or less. A ball mill, bead mill, wet jet mill, or the like can be used for mixing and dispersing the slurry. In any mixing method, it is desirable to carry out the mixing until thermal decomposition is completed at a predetermined temperature or lower.

The slurry that has been mixed and dispersed is dried at 100° C. or higher and 300° C. or lower to remove water. The dry powder is calcined by thermal treatment at 800° C. or higher and 1200° C. or lower in air gas for 0.5 to 5 hours. The calcination causes the rare earth element and magnesium to form a solid solution in the barium titanate. In this manner, the calcination is an example of the thermal treatment. Whether or not the rare earth element and magnesium are solid-solved in barium titanate in the obtained dielectric powder can be determined by DSC measurement (differential scanning calorimetry) of the powder. Specifically, if the transition peak temperature between tetragonal and cubic crystals near 125° C. shifts by 1° C. or more compared to barium titanate in which rare earth elements and magnesium are not solid-solved, it can be determined that the rare earth element and magnesium are solid-solved in the barium titanate of the dielectric powder.

An additive compound may be added to the resulting ceramic powder, in accordance with purposes. The additive compound may be an oxide of magnesium (Mg), manganese (Mn), molybdenum (Mo), vanadium (V), chromium (Cr), or a rare earth element (yttrium (Y), samarium (Sm), europium (Eu), gadolinium (Gd), terbium (Tb), dysprosium (Dy), holmium (Ho), erbium (Er), thulium (Tm) and ytterbium (Yb), or an oxide of cobalt (Co), nickel (Ni), lithium (Li), boron (B), sodium (Na), potassium (K) or silicon (Si), or a glass including cobalt, nickel, lithium, boron, sodium, potassium or silicon.

For example, the resulting dielectric powder is wet-blended with additives and is dried and crushed. For example, the particle diameter may be adjusted by crushing the resulting dielectric powder as needed. Alternatively, the grain diameter of the resulting dielectric powder may be adjusted by combining the crushing and classifying.

(Forming of ceramic green sheet) Next, a binder such as polyvinyl butyral (PVB) resin, an organic solvent such as ethanol or toluene, and a plasticizer are added to the resulting dielectric powder and wet-blended. With use of the resulting slurry, a ceramic green sheet is formed on a base material by, for example, a die coater method or a doctor blade method, and then dried. It is preferable that the thickness of the ceramic green sheet is 1 μm or more and 5 μm or less from a viewpoint of high capacity and high insulation property.

(Forming of internal electrode pattern) Next, a metal conductive paste for forming internal electrode layers containing an organic binder is printed on the surface of the ceramic green sheet by screen printing, gravure printing, or the like, so that internal electrode patterns are alternately led out to a pair of external electrodes having different polarities. Ceramic particles are added to the metal conductive paste as a co-material. Although the main component of the ceramic particles is not particularly limited, it is preferably the main component is the same as the main component ceramic of the dielectric layer 11. For example, barium titanate having an average particle size of 50 nm or less may be uniformly dispersed.

(Crimping Process) Next, the ceramic green sheets on which the internal electrode pattern is printed are cut into a predetermined size. The resulting ceramic green sheets are peeled from the base materials. A predetermined number (for example, 100 to 1000) of the ceramic green sheets are stacked so that the internal electrode layers 12 and the dielectric layers 11 are alternately arranged, and the edges of the internal electrode layers 12 are alternately extracted to the pair of the external electrodes 20a and 20b. Cover sheets for forming the cover layer 13 are crimped to the top and bottom of the stacked ceramic green sheets, and cut into a predetermined chip size (for example, 1.0 mm×0.5 mm).

(Firing process) The binder is removed from the resulting green multilayer structure for approximately 8 hours in a nitrogen atmosphere at 250 degrees C. The resulting green multilayer structure is fired for 10 minutes to 2 hours in a reductive atmosphere having an oxygen partial pressure of $10^{-14}$ to $10^{-10}$ atm in a temperature range of 1100 degrees C. to 1300 degrees C.

(Re-oxidizing process) In order to return oxygen to barium titanate, which is the partially reduced main phase of the dielectric layer 11 fired in a reducing atmosphere, a thermal process is performed at 600° C. to 1000° C. in a nitrogen atmosphere so that the internal electrode layer 12 is not oxidized. This step is called a re-oxidation process.

(Forming process of external electrode) A metal paste containing glass frit is applied to the two end faces of the obtained multilayer chip 10 by a dipping method, and baked at about 800° C. in a nitrogen atmosphere to form a base layer. After that, metal coating such as copper, nickel, and tin is applied to the base layer by plating. Thereby, the external electrodes 20a and 20b are formed. Through the above processes, the multilayer ceramic capacitor 100 is completed.

According to the manufacturing method according to the present embodiment, the dielectric powder, in which barium titanate is the main component, at least one rare earth element is solid-solved at 0.3 at % or more and 2.0 at % or less with respect to titanium, and magnesium is solid-solved at 0.1 at % or more and 1.0 at % or less with respect to titanium, is used. By using the dielectric powder in which the rare earth element is solid-solved in advance in this manner, the generation of oxide ion vacancies in the core portion 31 can be suppressed. In addition, since the rare earth element is solid-solved at 0.3 at % or more and 2.0 at % or less with respect to titanium, and magnesium is solid-solved at 0.1 at % or more and 1.0 at % or less with respect to titanium, the temperature characteristics of the relative permittivity are stabilized. Electrical neutrality is maintained, leak current is reduced. By suppressing the formation of oxide ion vacancies, even when a high electric field strength is applied, the leak current remains low and increasing of the leak current is suppressed and high temperature load life can be obtained.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

Example 1

Dysprosium oxide and magnesium oxide were dispersed in water, and barium carbonate and titanium dioxide were added to the aqueous solution containing carboxylate ammonium salt as a dispersant to form a slurry, which was mixed and dispersed. Dysprosium was 0.3 at % with respect to titanium, and magnesium was 0.1 at % with respect to titanium. Also, the Ba/Ti ratio was set to 0.995. After finishing the mixing and dispersion treatment, the slurry was dried at 100° C. to 300° C. to remove water. The dried powder was calcined at 800° C. to 1200° C. in air gas for 0.5 hour to 5 hours to synthesize barium titanate ceramic having an average particle size of 0.2 m, and used as dielectric powder. Thus, in the dielectric powder, 0.3 mol of dysprosium and 0.1 mol of magnesium were solid-solved in 100 mol of titanium.

Next, with respect to 100 mol of titanium in the obtained dielectric powder, 1.5 mol of dysprosium dioxide ($Dy_2O_3$), 1.0 mol of magnesium oxide, 0.3 mol of manganese oxide (MnO), 0.3 m of 1 of vanadium oxide ($V_2O_5$) and 1.0 mol of silicon dioxide ($SiO_2$) were added. And a binder such as polyvinyl butyral (PVB) resin, an organic solvent such as ethanol or toluene, and a plasticizer were added and wet-mixed to form a slurry. Next, the obtained slurry was used to form a ceramic green sheet of 3.0 μm by a doctor blade method.

Next, a nickel conductive paste containing an organic binder was printed on the main surface of the obtained ceramic green sheet to form an internal electrode pattern. Next, a plurality of ceramic green sheets on which the internal electrode patterns were formed were stacked so that the sides from which the nickel conductive paste was drawn out were alternately stacked to obtain a green multilayer structure.

Next, the binder was removed from the obtained green multilayer structure in a nitrogen atmosphere at 250° C. for 8 hours. And then in a reducing atmosphere with an oxygen partial pressure of $10^{-14}$ to $10^{-10}$ atm at 1100° C. to 1300° C. for 10 minutes to 2 hours, a multilayer chip was obtained. After that, re-oxidation process was performed at 600° C. to 1000° C. in a nitrogen gas atmosphere.

Next, a copper paste containing glass frit was applied to both ends of the obtained multilayer chip, and baked at 800° C. in a nitrogen atmosphere. Furthermore, nickel plating and tin plating were applied to the surfaces of the external electrodes to obtain a multilayer ceramic capacitor. The obtained multilayer ceramic capacitor had external dimensions of 1.2 mm in width, 2.0 mm in length, and 0.5 mm in thickness. The thickness of the dielectric layer interposed between internal electrode layers was 2.4 m. The number of the dielectric layers interposed between the internal electrode layers was 10.

Example 2

In Example 2, when synthesizing the dielectric powder, the mount of dysprosium was 0.3 at % with respect to titanium, and the amount of magnesium was 1.0 at % with respect to titanium. Thus, in the dielectric powder, 0.3 mol of dysprosium and 1.0 mol of magnesium were solid-solved with respect to 100 mol of titanium. Other conditions were the same as in Example 1.

Example 3

In Example 3, when synthesizing the dielectric powder, 2.0 at % of dysprosium was used with respect to titanium, and 0.1 at % of magnesium was used with respect to titanium. Thus, in the dielectric powder, 2.0 mol of dysprosium and 0.1 mol of magnesium were solid-solved with respect to 100 mol of titanium. Other conditions were the same as in Example 1.

Example 4

In Example 4, when synthesizing the dielectric powder, 2.0 at % of dysprosium was used with respect to titanium, and 1.0 at % of magnesium was used with respect to titanium. Thus, in the dielectric powder, 2.0 mol of dysprosium and 1.0 mol of magnesium were solid-solved with respect to 100 mol of titanium. Other conditions were the same as in Example 1.

Example 5

In Example 5, europium dioxide ($Eu_2O_3$) was used instead of dysprosium dioxide when synthesizing the dielectric powder. The amount of europium was 1.0 at % with respect to titanium, and the amount of magnesium was 0.5 at % with respect to titanium. Thus, in the dielectric powder, 1.0 mol of europium and 0.5 mol of magnesium were solid-solved with respect to 100 mol of titanium. Other conditions were the same as in Example 1.

Example 6

In Example 6, gadolinium dioxide ($Gd_2O_3$) was used instead of dysprosium dioxide when synthesizing the dielectric powder. The amount of gadolinium was 1.0 at % with respect to titanium, and the amount of magnesium was 0.5 at % with respect to titanium. Thus, in the dielectric powder, 1.0 mol of gadolinium and 0.5 mol of magnesium were solid-dissolved with respect to 100 mol of titanium. Other conditions were the same as in Example 1.

Example 7

In Example 7, holmium dioxide ($Ho_2O_3$) was used instead of dysprosium dioxide when synthesizing the dielectric powder. The amount of holmium was 1.0 at % with respect to titanium, and the amount of magnesium was 0.5 at % with respect to titanium. Thus, in the dielectric powder, 1.0 mol of holmium and 0.5 mol of magnesium were solid-solved with respect to 100 mol of titanium. Other conditions were the same as in Example 1.

Example 8

In Example 8, not only dysprosium dioxide but also europium dioxide was used when synthesizing the dielectric powder. The amount of dysprosium was 0.5 at % with respect to titanium, the amount of europium was 0.5 at % with respect to titanium, and the amount of magnesium was 0.5 at % with respect to titanium. Thus, in the dielectric powder, 0.5 mol of dysprosium, 0.5 mol of gadolinium, and 0.5 mol of magnesium were solid-solved with respect to 100 mol of titanium. Other conditions were the same as in Example 1.

Example 9

In Example 9, not only dysprosium dioxide but also europium dioxide and gadolinium dioxide were used when synthesizing the dielectric powder. The amount of dysprosium was 0.33 at % with respect to titanium, the amount of europium was 0.33 at % with respect to titanium, the amount of gadolinium was 0.33 at % with respect to titanium, and the amount of magnesium was 0.5 at % with respect to titanium. Thus, in the dielectric powder, 0.33 mol of dysprosium, 0.33 mol of europium, 0.33 mol of gadolinium, and 0.5 mol of magnesium were solid-solved with respect to 100 mol of titanium. Other conditions were the same as in Example 1.

Example 10

In Example 10, not only dysprosium dioxide, but also europium dioxide, gadolinium dioxide, and holmium dioxide were used when synthesizing the dielectric powder. The amount of dysprosium was 0.25 at % with respect to titanium, the amount of europium was 0.25 at % with respect to titanium, the amount of gadolinium was 0.25 at % with respect to titanium, the amount of holmium was 0.25 at % with respect to titanium, and the amount of magnesium was 0.5 at % with respect to titanium. Thus, in the dielectric powder, 0.25 mol of dysprosium, 0.25 mol of europium, 0.25 mol of gadolinium, 0.25 mol of holmium, and 0.5 mol of magnesium were solid-solved with respect to 100 mol of titanium. Other conditions were the same as in Example 1.

Comparative Example 1

In Comparative Example 1, when synthesizing the dielectric powder, the amount of dysprosium was 0.2 at % with respect to titanium, and the amount of magnesium was 0.1 at % with respect to titanium. Thus, in the dielectric powder, 0.2 mol of dysprosium and 0.1 mol of magnesium were solid-solved in 100 mol of titanium. Other conditions were the same as in Example 1.

Comparative Example 2

In Comparative Example 2, when synthesizing the dielectric powder, the amount of dysprosium was 0.2 at % with respect to titanium, and the amount of magnesium was 1.0 at % with respect to titanium. Thus, in the dielectric powder, 0.2 mol of dysprosium and 1.0 mol of magnesium were solid-solved with respect to 100 mol of titanium. Other conditions were the same as in Example 1.

Comparative Example 3

In Comparative Example 3, when synthesizing the dielectric powder, the amount of 2.5 at % of dysprosium was used with respect to titanium, and the amount of 0.1 at % of magnesium was used with respect to titanium. Thus, in the dielectric powder, 2.5 mol of dysprosium and 0.1 mol of magnesium were solid-solved with respect to 100 mol of titanium. Other conditions were the same as in Example 1.

Comparative Example 4

In Comparative Example 4, when synthesizing the dielectric powder, the amount of 2.5 at % of dysprosium was used with respect to titanium, and the amount of 1.0 at % of magnesium was used with respect to titanium. Thus, in the dielectric powder, 2.5 mol of dysprosium and 1.0 mol of magnesium were solid-solved with respect to 100 mol of titanium. Other conditions were the same as in Example 1.

Comparative Example 5

In Comparative Example 5, when synthesizing the dielectric powder, the amount of dysprosium was 0.3 at % with respect to titanium, and the amount of magnesium was 0.05 at % with respect to titanium. Thus, in the dielectric powder, 0.3 mol of dysprosium and 0.05 mol of magnesium were solid-solved with respect to 100 mol of titanium. Other conditions were the same as in Example 1.

Comparative Example 6

In Comparative Example 6, when synthesizing the dielectric powder, the amount of 0.3 at % of dysprosium was used with respect to titanium, and the amount of 1.5 at % of magnesium was used with respect to titanium. Thus, in the dielectric powder, 0.3 mol of dysprosium and 1.5 mol of magnesium were solid-solved with respect to 100 mol of titanium. Other conditions were the same as in Example 1.

Comparative Example 7

In Comparative Example 7, when synthesizing the dielectric powder, the amount of 2.0 at % of dysprosium was used with respect to titanium, and the amount of 0.05 at % of magnesium was used with respect to titanium. Thus, in the dielectric powder, 2.0 mol of dysprosium and 0.05 mol of magnesium were solid-solved with respect to 100 mol of titanium. Other conditions were the same as in Example 1.

Comparative Example 8

In Comparative Example 8, when synthesizing the dielectric powder, the amount of 2.0 at % of dysprosium was used with respect to titanium, and the amount of 1.5 at % of magnesium was used with respect to titanium. Thus, in the dielectric powder, 2.0 mol of dysprosium and 1.5 mol of magnesium were solid-solved with respect to 100 mol of titanium. Other conditions were the same as in Example 1.

(Temperature characteristics of dielectric constant) The temperature characteristics of dielectric constant were examined for each of the multilayer ceramic capacitors of Examples 1 to 10 and Comparative Examples 1 to 8. Specifically, the electrostatic capacity was measured at a measurement frequency of 1 kHz and a measurement voltage of 1.0 Vrms in the range of −55° C. to 125° C. If the obtained result satisfied the X7T characteristic, the temperature characteristic of the dielectric constant is judged to be good "○", and if the obtained result did not satisfy the X7T characteristic, the temperature characteristic of the dielectric constant is judged to be bad "x".

(Measurement of mean time to failure (MTTF) and leakage current) As a reliability evaluation, a reliability test was performed by applying a DC electric field of 20 V/rms at 150° C. For each of the multilayer ceramic capacitors of Examples 1 to 10 and Comparative Examples 1 to 8, Weibull analysis was performed on 20 samples, using the time from the start of voltage application until the insulation resistance dropped by one digit as the failure time. Also, the current 10 seconds after the start of the test was taken as the leakage current. If the leakage current was 20 μA or less, the leakage current was judged to be good "○", and if the leakage current exceeded 20 μA, the leakage current was judged to be bad "x". If the MTTF was 10,000 minutes or more, the MTTF was judged to be good "○", and if the MTTF was less than 10,000 minutes, the MTTF was judged to be bad "x".

For Examples 1 to 10, the temperature characteristics of relative dielectric constant, leakage current, and MTTF were all judged to be good "○". It is considered that this was because the dielectric powder contained barium titanate as a main component, the dielectric powder contained at least one kind of rare earth element in a solid solution of 0.3 at % or more and 2.0 at % or less with respect to titanium, and magnesium in a solid solution of 0.1 at % or more and 1.0 at % or less, the core portion of the core-shell grains of the dielectric layer contained barium titanate as the main component, and at least one rare earth element was solid-solved at 0.3 at % or more and 2.0 at % or less with respect to titanium, and magnesium was solid-solved at 0.1 at % or more and 1.0 at % or less with respect to titanium.

In Comparative Example 1, the leak current and MTTF were judged to be bad "x". It is considered that this was because the solid solution amount of the rare earth element was insufficient in the dielectric powder. In Comparative Example 2, the MTTF was judged to be bad "x". It is considered that this was because the solid solution amount of the rare earth element was insufficient in the dielectric powder. In Comparative Example 3, the temperature characteristics of the dielectric constant and the leak current were judged to be bad "x". It is considered that this was because the amount of solid solution of the rare earth element was too large in the dielectric powder. In Comparative Example 4, the temperature characteristic of dielectric constant was judged to be bad "x". It is considered that this was because the amount of solid solution of the rare earth element was too large in the dielectric powder. In Comparative Example 5, the leakage current and MTTF were judged to be bad "x". It is considered that this was because the solid solution amount of magnesium was insufficient in the dielectric powder. In Comparative Example 6, the temperature characteristic of dielectric constant was judged to be bad "x". It is considered that this was because the amount of solid solution of magnesium in the dielectric powder was too large. In Comparative Example 7, the leakage current was judged to be bad "x". It is considered that this was because the solid solution amount of magnesium was insufficient in the dielectric powder. In Comparative Example 8, the temperature characteristic of dielectric constant was judged to be bad "x". It is considered that this was because the amount of solid solution of magnesium in the dielectric powder was too large. Table 1 shows the results.

TABLE 1

| | RARE EARTH ELEMENT | ADDED AMOUNT RARE EARTH [at %] | Mg [at %] | X7T | LEAK CURRENT [μA] | JUDGE | MTTF [MIN] | JUDGE | TOTAL JUDGE |
|---|---|---|---|---|---|---|---|---|---|
| EXAMPLE 1 | Dy | 0.3 | 0.1 | ○ | 5.2 | ○ | 20000 | ○ | ○ |
| EXAMPLE 2 | Dy | 0.3 | 1.0 | ○ | 1.5 | ○ | 25000 | ○ | ○ |
| EXAMPLE 3 | Dy | 2.0 | 0.1 | ○ | 9.6 | ○ | 53000 | ○ | ○ |
| EXAMPLE 4 | Dy | 2.0 | 1.0 | ○ | 0.8 | ○ | 65000 | ○ | ○ |
| EXAMPLE 5 | Eu | 1.0 | 0.5 | ○ | 1.6 | ○ | 39000 | ○ | ○ |
| EXAMPLE 6 | Gd | 1.0 | 0.5 | ○ | 1.4 | ○ | 42000 | ○ | ○ |
| EXAMPLE 7 | Ho | 1.0 | 0.5 | ○ | 1.0 | ○ | 39000 | ○ | ○ |
| EXAMPLE 8 | Dy,Eu | Dy = 0.5 Eu = 0.5 | 0.5 | ○ | 2.0 | ○ | 36000 | ○ | ○ |
| EXAMPLE 9 | Dy,Eu,Gd | Dy = 0.33 Eu = 0.33 Gd = 0.33 | 0.5 | ○ | 1.6 | ○ | 32000 | ○ | ○ |
| EXAMPLE 10 | Dy,Eu,Gd,Ho | Dy = 0.25 Eu = 0.25 Gd = 0.25 Ho = 0.25 | 0.5 | ○ | 1.2 | ○ | 35000 | ○ | ○ |
| COMPARATIVE EXAMPLE 1 | Dy | 0.2 | 0.1 | ○ | 60 | × | 5000 | × | × |
| COMPARATIVE EXAMPLE 2 | Dy | 0.2 | 1.0 | ○ | 6.4 | ○ | 8700 | × | × |
| COMPARATIVE EXAMPLE 3 | Dy | 2.5 | 0.1 | × | 35 | × | 28000 | ○ | × |
| COMPARATIVE EXAMPLE 4 | Dy | 2.5 | 1.0 | × | 2.4 | ○ | 20000 | ○ | × |
| COMPARATIVE EXAMPLE 5 | Dy | 0.3 | 0.05 | ○ | 80 | × | 6500 | × | × |
| COMPARATIVE EXAMPLE 6 | Dy | 0.3 | 1.5 | × | 1.8 | ○ | 15000 | ○ | × |
| COMPARATIVE EXAMPLE 7 | Dy | 2.0 | 0.05 | ○ | 80 | × | 25000 | ○ | × |
| COMPARATIVE EXAMPLE 8 | Dy | 2.0 | 1.5 | × | 0.6 | ○ | 25000 | ○ | × |

Although the embodiments of the present invention have been described in detail, it is to be understood that the various change, substitutions, and alterations could be made hereto without departing from the spirit and scope of the invention.

What is claimed is:

1. A dielectric powder comprising:
   barium titanate as a main component;
   at least one type of rare earth element that is solid-solved at 0.3 at % or more and 2.0 at % or less with respect to titanium; and
   magnesium that is solid-solved at 0.1 at % or more and 1.0 at % or less with respect to titanium.

2. The dielectric powder as claimed in claim 1, wherein the at least one type of rare earth element is at least one of europium, gadolinium, dysprosium, or holmium.

3. The dielectric powder as claimed in claim 1, wherein a solid solution amount of the at least one type of rare earth element is 1.5 at % or less with respect to titanium.

4. The dielectric powder as claimed in claim 1, wherein a solid-solution amount of magnesium is 0.8 at % or less with respect to titanium.

5. The dielectric powder as claimed in claim 1, wherein a transition peak temperature between tetragonal and cubic crystals at 125° C. shifts by 1° C. or more compared to a dielectric powder having a main component of barium titanate in which the at least one type of rare earth element and magnesium are not solid-solved, in differential scanning calorimetry.

6. The dielectric powder as claimed in claim 1, wherein magnesium is solid-solved at 0.5 at % or more and 1.0 at % or less with respect to titanium.

7. The dielectric powder as claimed in claim 1, wherein the at least one type of rare earth element is solid-solved at 1.0 at % or more and 2.0 at % or less with respect to titanium.

8. The dielectric powder as claimed in claim 1, wherein the at least one type of rare earth element is at least europium.

9. The dielectric powder as claimed in claim 1, wherein the at least one type of rare earth element is at least two types of rare earth element.

10. A multilayer ceramic electronic device comprising:
a plurality of dielectric layers that includes a core-shell grain including a core portion and a shell portion including an additive, the core portion has a structure, in which barium titanate is a main component, at least one type of rare earth element is solid-solved at 0.3 at % or more and 2.0 at % or less with respect to titanium, and magnesium is solid-solved at 0.1 at % or more and 1.0 at % or less with respect to titanium;
a plurality of internal electrode layers, each of which faces each other through each of the plurality of dielectric layers;
a first external electrode that is electrically connected to part of the plurality of internal electrode layers; and
a second external electrode is electrically connected to another part of the plurality of internal electrode layers.

11. The multilayer ceramic electronic device as claimed in claim 10, wherein the at least one type of rare earth element is at least one of europium, gadolinium, dysprosium, or holmium.

12. The multilayer ceramic electronic device as claimed in claim 10, wherein in the core portion, a solid solution amount of the at least one type of rare earth element is 1.0 at % or less with respect to titanium.

13. The multilayer ceramic electronic device as claimed in claim 10, wherein in the core portion, a solid-solution amount of magnesium is 0.5 at % or less with respect to titanium.

14. The multilayer ceramic electronic device as claimed in claim 10, wherein the multilayer ceramic electronic device satisfies X7T characteristic.

15. A manufacturing method of a dielectric powder comprising:
mixing at least one type of rare earth element, magnesium, barium compound and titanium compound so that an amount of the at least one type of rare earth element is 0.3 at % or more and 2.0 at % or less with respect to titanium and an amount of magnesium is 0.1 at % or more and 1.0 at % or less with respect to titanium;
forming slurry of which a main component is barium titanate, by solid phase reaction of the at least one type of rare earth element, the magnesium, the barium compound and the titanium compound; and
solid-solving the at least one type of rare earth element in the barium titanate by thermal treatment of the slurry.

16. The method as claimed in claim 15,
wherein the barium compound is barium carbonate, and wherein the titanium compound is titanium dioxide.

17. The method as claimed in claim 15,
wherein the thermal treatment includes obtaining dried powder by removing water from the slurry, and thermally treating the dried powder for 0.5 hours to 5 hours at 800 degrees C. or more and 1200 degrees C. or less.

18. A manufacturing method of a multilayer ceramic electronic device comprising:
forming a ceramic green sheet by adding an additive to a dielectric powder, in which barium titanate is a main component, at least one type of rare earth element is solid-solved at 0.3 at % or more and 2.0 at % or less with respect to titanium, and magnesium is solid-solved at 0.1 at % or more and 1.0 at % or less with respect to titanium;
forming an internal electrode pattern on the ceramic green sheet;
forming a multilayer structure by stacking a plurality of the ceramic green sheet on which the internal electrode pattern is formed; and
forming a multilayer chip by firing the multilayer structure so that the multilayer chip includes a plurality of dielectric layers that include a core-shell grain including a core portion and a shell portion including an additive, the core portion having a structure, in which barium titanate is a main component, at least one type of rare earth element is solid-solved at 0.3 at % or more and 2.0 at % or less with respect to titanium, magnesium is solid-solved at 0.1 at % or more and 1.0 at % or less with respect to titanium, and a plurality of internal electrode layers, each of which faces each other through each of the plurality of dielectric layers.

19. The method as claimed in claim 18, further comprising:
forming an external electrode on the multilayer chip.

20. The method as claimed in claim 18, wherein in the firing, an external electrode is formed on the multilayer structure, and the multilayer structure and the external electrode are fired.

* * * * *